July 11, 1961 W. S. HAYES 2,992,419
WARNING DEVICES
Filed Sept. 16, 1957 2 Sheets-Sheet 1

INVENTOR.
William S. Hayes
BY
J. W. Lovett
ATTORNEY

July 11, 1961

W. S. HAYES 2,992,419

WARNING DEVICES

Filed Sept. 16, 1957

INVENTOR.
William S. Hayes
BY J.W. Lovett
ATTORNEY

United States Patent Office 2,992,419
Patented July 11, 1961

2,992,419
WARNING DEVICES
William S. Hayes, Flint, Mich., assignor to General Motors Corporation, Detroit, Mich., a corporation of Delaware
Filed Sept. 16, 1957, Ser. No. 684,149
1 Claim. (Cl. 340—263)

This invention relates to warning devices and more particularly to devices adapted to effect a warning signal when a predetermined condition obtains such as the attainment of a given vehicle speed or a definite range or reading of an indicating instrument.

It will be appreciated that the present invention may or may not be associated with an indicating instrument such as a speedometer. Obviously and as will appear, the warning given may be understood without glancing at any instrument.

In driving on modern super-highways it has become increasingly evident that warning devices are desirable which are capable of indicating the attainment of certain speeds. Such devices should give forth visual or sound effects minimizing the necessity for drivers removing their eyes from the road in determining the speed. These devices also should be adjustable to suit conditions for obviously a given speed may be safe under certain conditions and clearly foolhardy under other conditions. It also is evident that such devices should be simple in construction and reliable in use with a minimum of detraction from the accuracy of any instruments with which the devices may be associated.

An object of the present invention is to provide an improved warning device with or without an indicating instrument, the device being of simple construction and reliable in operation.

A feature of the invention is a warning device utilizing an electrical contact element attached to a speed cup of an instrument such as used on speedometers. Another feature is a warning device employing a contact element and a printed circuit adapted to effect a signal by virtue of an electrical current controlled by the positioning of the contact element.

These and other important features of the invention will now be described in detail in the specification and then pointed out more particularly in the appended claims.

Although the invention may be practiced with or without an instrument adapted to give measurement reading as heretofore stated, the drawings show it as associated with a speedometer similar in structure to that disclosed in the United States Patent No. 2,073,153 granted March 9, 1937, in the name of Ralph O. Helgeby. The combination with an indicating instrument is preferable in most instances.

Figure 1:
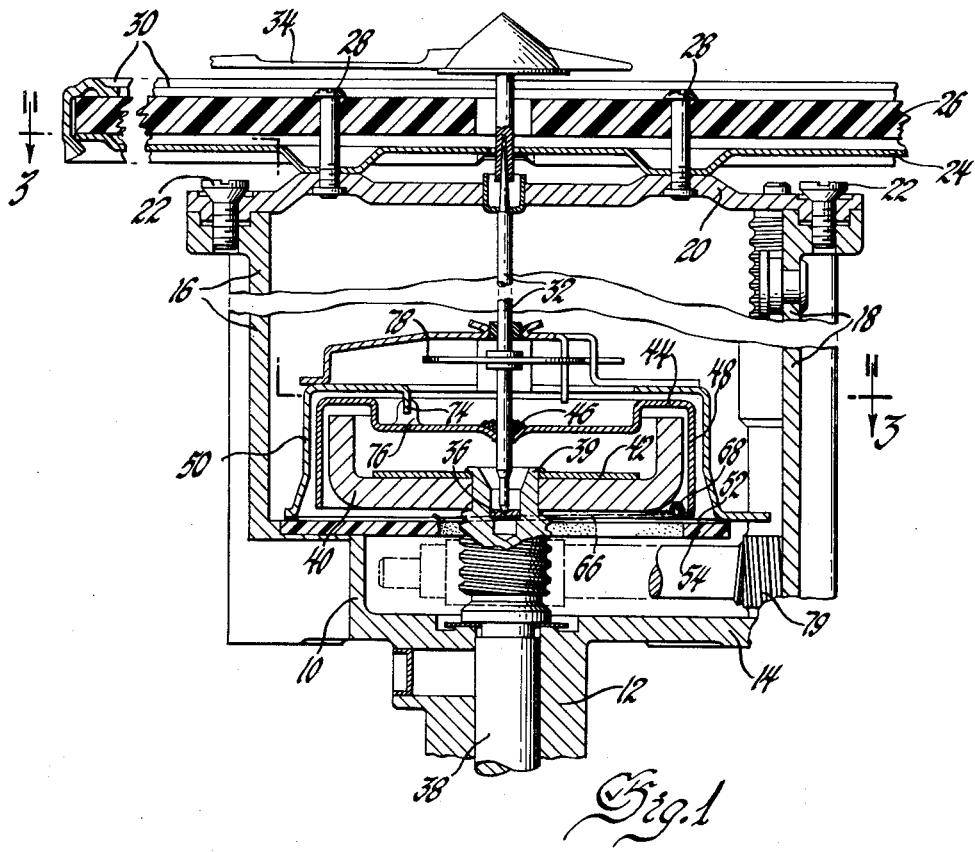
FIG. 1 is a sectional view looking in the direction of the arrows 1—1 in FIG. 3, certain parts being broken away better to illustrate the construction.
Figure 2:
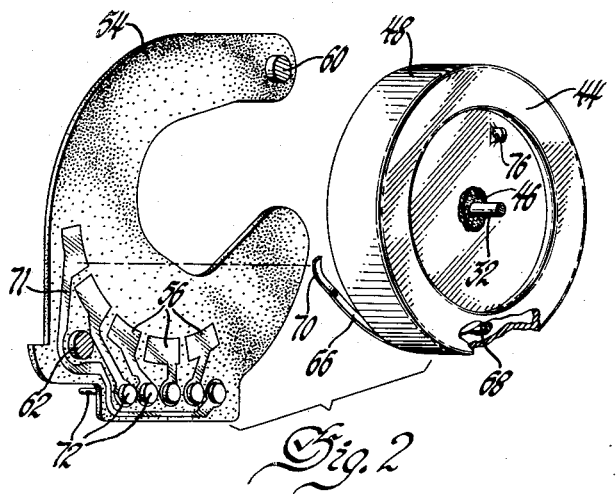
FIG. 2 is an exploded and perspective view of certain details of construction shown in FIG. 1.
Figure 3:
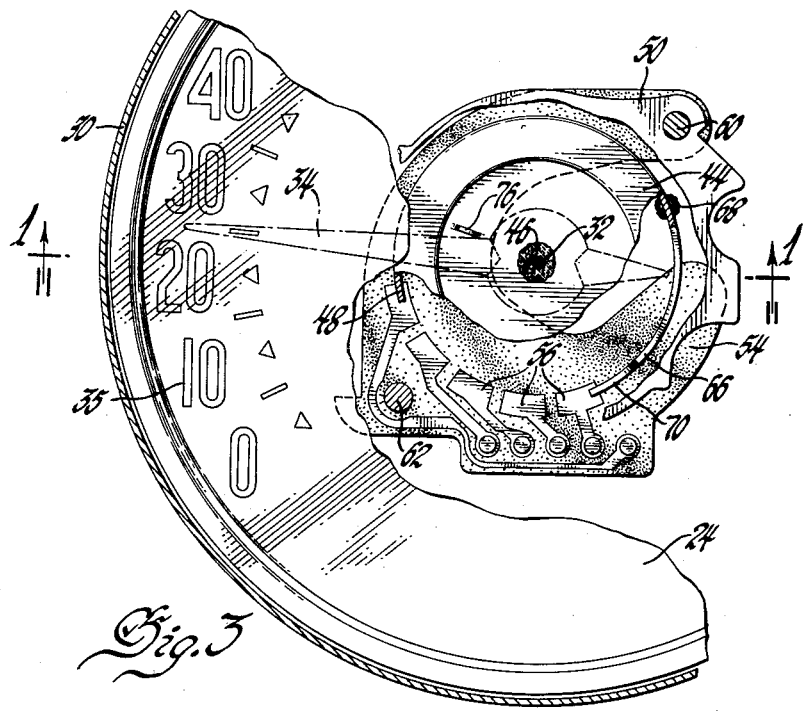
FIG. 3 is a view looking in the direction of arrows 3—3 in FIG. 1 with parts broken away and a field cup being removed.

The speedometer comprises a die-cast frame 10 having a tubular shank 12 projecting from a base 14 and is provided with side walls 16 and 18. An end plate 20 is joined to the frame 10 by means of screws 22 to constitute an instrument casing. A dial plate 24 and a transparent plate 26 are joined to the end plate 20 by means of bolts 28 and a bezel 30 surrounds the peripheries of the plates 24 and 26. A spindle 32 is journaled conventionally on the end plate 20 and protrudes through the dial plate 24 and the plate 26 to support a pointer 34. The latter is adapted to move over the dial plate indicia 35 (FIG. 3) to give a visual indication of vehicle speed as is customary. The lower end of the spindle 32 rotates on a step bearing 36 at the upper end of a drive shaft 38. The latter is rotatably mounted in the shank 12 as usual and is adapted to be driven by a flexible cable. A U-shaped magnet 40 with a temperature compensator 42 associated therewith is secured to the upper end of the shaft 38, the end 39 of the latter being spun over for the purpose. A speed cup 44 is fixed as at 46 to the spindle 32, its peripheral wall 48 surrounding the two legs of the magnet 40. A field cup 50 surrounds the speed cup 44 and is supported non-rotatively on but out of contact with the frame 14. Interposed between the depending margin of the cup 50 and the frame 14 are an insulating washer 52 and a plastic plate 54 having five spaced copper inserts or printed contacts thereon. These contacts are in the form of segments 56 arranged in an arc concentric with the speed cup 48. The plastic plate 54 is fixed firmly to the frame 14 by fastening means 60 and 62 the nature of which is not specifically disclosed and which may be varied widely.

An elongated and arcuate spring arm 66 is provided having one end fixed to the speed cup wall 48 as at 68. This arm conforms in curvature with the periphery of the cup 44 to terminate in a curved contact end 70 lightly and tangentially engaging the surface of plastic plate 54 or one of the segments 56.

The segments 56 each have a lead 71 connected to a prong 72 which extends through the plastic plate 54.

A tongue 74 is bent down as a part of the field cup 50 to engage an upwardly extending lug 76 on the speed cup thereby being adapted to limit the rotating influence of a helical spring 78. This arrangement is the customary construction in which the spring 78 resiliently holds the lug 76 and tongue 74 in contact with the pointer 34 indicating zero speed. Other customary parts of the instrument, such as the odometer reset gearing 79, are described in the United States Patent 2,073,153 heretofore referred to.

Figure 4:
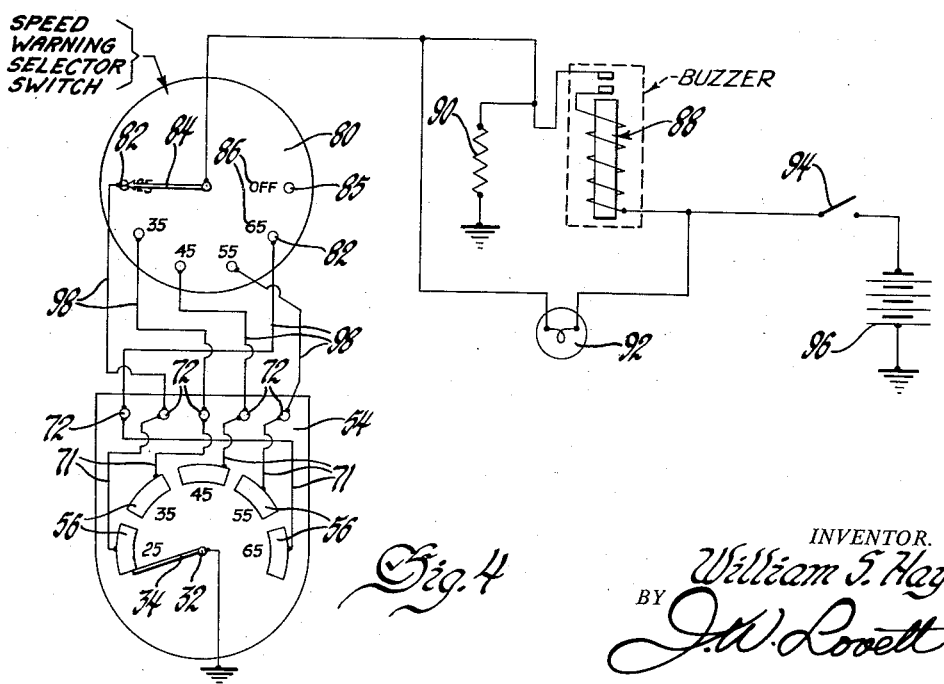
FIG. 4 is a diagrammatic representation of the device of FIG. 1 with the electrical circuitry for effecting a warning by sound and visually.

Intimately or remotely associated with but located outside the instrument frame 14 or casing is a selector switch of conventionally multi-contact construction and which is diagrammatically illustrated in FIG. 4 as a rotary switch 80 having five contacts 82 through each of which a circuit may be established by turning a contact arm 84 by means of a hand knob which is not illustrated. Legends 86 are provided on the face plate of the switch to indicate five vehicle speeds and an "Off" position shown at 85.

Two warning devices are employed. One of them is shown as a buzzer 88 connected in series with a suitable resistance 90. The other is a lamp 92 connected in parallel with the buzzer 88. Both warning devices are in series with an ignition switch 94 which is connected to ground by way of a battery 96. The speedometer shaft 32 is grounded as is obvious by virtue of the speedometer construction and the contact segments 56 are connected through the prongs 72 and wires 98 to the contacts 82 in accordance with the diagram clearly illustrated in FIG. 4.

The arrangement is such that current supplied by the battery 96 upon closure of the ignition switch 94 will pass through the warning devices 88 and 92, the rotary switch 80 and the speedometer when the pointer 34 indicates a vehicle speed representing a segment 56 and a contact 82 placed in series by selection of the vehicle operator. If, for instance, the vehicle speed is 25 miles per hour, the pointer 34 will be positioned as indicated in FIG. 4. If the switch 80 is turned to the "Off" position or to any position other than the 25 miles per hour position, no current will flow and no signal will be imparted by the warning devices 88 and 92. If, however, the switch 80 is set at 25 miles per hour as shown, the light and buzzer will add to the pointer indication that the vehicle has reached that speed. If the vehicle speed is increased above the speed set by the switch 80, the warning signals will continue as long as the spring contact 66 is in touch with the 25 miles per hour segment 56.

I claim:

A warning device comprising an instrument casing, a magnetically driven speed cup rotatable on its own axis within said casing as a function of measurement such as vehicle speed, an arcuate spring arm extending substantially along the periphery of said cup and having one end fixed to the latter, spaced contacts fixed in the path of the oher end of said arm and adapted slidably and consecutively to be contacted by the other end of said arm when said cup is rotated in one direction, a pointer and a grounded shaft fixed to said cup to rotate therewith, a dial interposed between said pointer and said speed cup, multiple contact switch means outside said casing, electrically operative warning means, an electrical circuit including said warning means, said multiple contact switch means and said spaced contacts, and the arrangement being such that said switch means may be adjusted selectively to effect operation of said warning means at a predetermined and corresponding position of said pointer about said shaft and with relation to said dial.

References Cited in the file of this patent

UNITED STATES PATENTS

| | | |
|---|---|---|
| 2,673,907 | Purdy | Mar. 30, 1954 |
| 2,728,072 | Magid | Dec. 20, 1955 |
| 2,785,393 | Mininberg | Mar. 12, 1957 |
| 2,813,264 | Wargo | Nov. 12, 1957 |
| 2,833,877 | Acierno | May 6, 1958 |
| 2,880,288 | Rosenberg | Mar. 31, 1959 |
| 2,887,679 | Curva | May 19, 1959 |